United States Patent
Sakakima

(10) Patent No.: US 11,831,852 B2
(45) Date of Patent: Nov. 28, 2023

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Eito Sakakima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 17/359,868

(22) Filed: Jun. 28, 2021

(65) Prior Publication Data
US 2022/0006995 A1    Jan. 6, 2022

(30) Foreign Application Priority Data
Jul. 6, 2020 (JP) .................................. 2020-116643

(51) Int. Cl.
*H04N 13/117* (2018.01)
*H04N 5/222* (2006.01)
*H04N 23/69* (2023.01)
*H04N 23/695* (2023.01)

(52) U.S. Cl.
CPC ......... *H04N 13/117* (2018.05); *H04N 5/2224* (2013.01); *H04N 23/69* (2023.01); *H04N 23/695* (2023.01)

(58) Field of Classification Search
CPC ............... H04N 13/117; H04N 5/2224; H04N 5/23296; H04N 5/23299; H04N 5/232; H04N 5/247
USPC ........................................................... 348/47
See application file for complete search history.

(56) References Cited

U.S. PATENT DOCUMENTS

| 10,742,951 | B2 | 8/2020 | Sakakima | |
| 2018/0359458 | A1* | 12/2018 | Iwakiri | H04N 13/122 |
| 2019/0110736 | A1* | 4/2019 | Broderick | G06T 7/246 |
| 2020/0106959 | A1* | 4/2020 | Molina | H04N 13/106 |
| 2020/0145635 | A1* | 5/2020 | Yoneda | G06F 3/011 |
| 2021/0133944 | A1 | 5/2021 | Sakakima | |
| 2021/0281812 | A1 | 9/2021 | Sakakima | |
| 2021/0374391 | A1* | 12/2021 | Jorasch | G06V 40/10 |

FOREIGN PATENT DOCUMENTS

JP    2011-108165 A    6/2011

* cited by examiner

*Primary Examiner* — Loi H Tran
(74) *Attorney, Agent, or Firm* — Carter, DeLuca & Farrell LLP

(57) ABSTRACT

An information processing apparatus for generating a virtual camera path by interpolation using a plurality of key frames to be a reference in the virtual camera path that indicates a path of a position of a virtual camera, comprising: a designation unit configured to accept a key frame designation operation in accordance with a user operation; a specifying unit configured to specify the number of frames between a first key frame that has already been set and a second key frame designated by the user operation; a change amount specifying unit configured to specify an amount of change per unit of time of a virtual camera parameter between the first and second key frames based on the number of frames specified by the specifying unit; and a notification unit configured to notify, to a user, the specified amount of change.

12 Claims, 14 Drawing Sheets

INFORMATION PROCESSING APPARATUS, METHOD OF CONTROLLING INFORMATION PROCESSING APPARATUS, AND STORAGE MEDIUM

BACKGROUND

Field of the Invention

The present disclosure is related to an information processing apparatus, a method of controlling the information processing apparatus, and a storage medium, particularly a technique for generating camera paths such as virtual viewpoint images and CG animations.

Description of the Related Art

In recent years, a technique for generating virtual viewpoint content using a multi-viewpoint image obtained by selling a plurality of cameras at different positions and then synchronously capturing from multiple viewpoints has been attracting attention. By virtue of the technique of generating virtual viewpoint content from a multi-viewpoint image, for example, a highlight scene for soccer or basketball can be viewed from various angles; accordingly, a user can have a high level of perceived realism as compared to a normal image.

When generating virtual viewpoint content, information, which indicates a change (e.g., continuous movement of the virtual viewpoint or a zoom) on a timeline, called a camera path is generated.

There is a method of generating a camera path based on key frames as one of the methods of generating a camera path. This is a method of generating a final camera path by a user discretely selecting important frames on the camera path called key frames and then automatic interpolation processing between the key frames being performed. Generation of a camera path using the key frame method makes it possible to generate a camera path in which key frame in-betweens are smoothly interpolated; accordingly, the quality of virtual viewpoint content can be expected to improve.

Japanese Patent Laid-Open No. 2011-108165 discloses, in a case where trouble in which a camera path does not align with user intent is expected when generating a camera path between key frames, preventing troubles from occurring by newly setting another key frame between the key frames.

However, it can be considered that with the technique disclosed in Japanese Patent Laid-Open No. 2011-108165, it takes significant effort to generate a camera path that aligns with user intent. For example, in a case where the user wants to prevent a parameter related to a virtual viewpoint from changing abruptly, the level of change in the parameter is confirmed by performing a preview display of virtual viewpoint content after designating key frames, and then correction of the key frames and confirmation of the preview display are repeated. The burden on the user related to setting of virtual viewpoints may increase when such operations are performed.

The present disclosure has been made in consideration of the above-described problem, and provides a technique for reducing the burden on the user related to setting of virtual viewpoints.

SUMMARY

According to one aspect of the present disclosure, there is provided an information processing apparatus operable to generate a virtual camera path by interpolation using a plurality of key frames to be a reference in the virtual camera path that indicates a path of a position of a virtual camera, the apparatus comprising: a designation unit configured to accept a key frame designation operation in accordance with a user operation; a specifying unit configured to specify the number of frames between a first key frame that has already been set and a second key frame designated by the user operation; a change amount specifying unit configured to specify an amount of change per unit of time of a virtual camera parameter between the first key frame and the second key frame based on the number of frames specified by the specifying unit; and a notification unit configured to notify, to a user, the amount of change specified by the change amount specifying unit.

Further features of the present disclosure will become apparent from the following description of exemplary embodiments (with reference to the attached drawings).

DESCRIPTION OF THE EMBODIMENTS

Embodiments will be described hereinafter in detail with reference to the accompanying drawings. Note that the following embodiments do not limit the disclosure in regard to the scope of the patent claims. A plurality of features are described in the embodiments. However, not all the combinations of the plurality of features are necessarily essential, and the plurality of features may arbitrarily be combined. Furthermore, in the attached drawings, the same or equivalent components are denoted with the same reference number, and redundant descriptions will be omitted.

First Embodiment

In a first embodiment, an example of enabling to determine what kind of a camera path it will be by displaying an amount of change between key frames when setting the key frames will be described.

<Hardware Configuration of Information Processing Apparatus>

Figure 1:
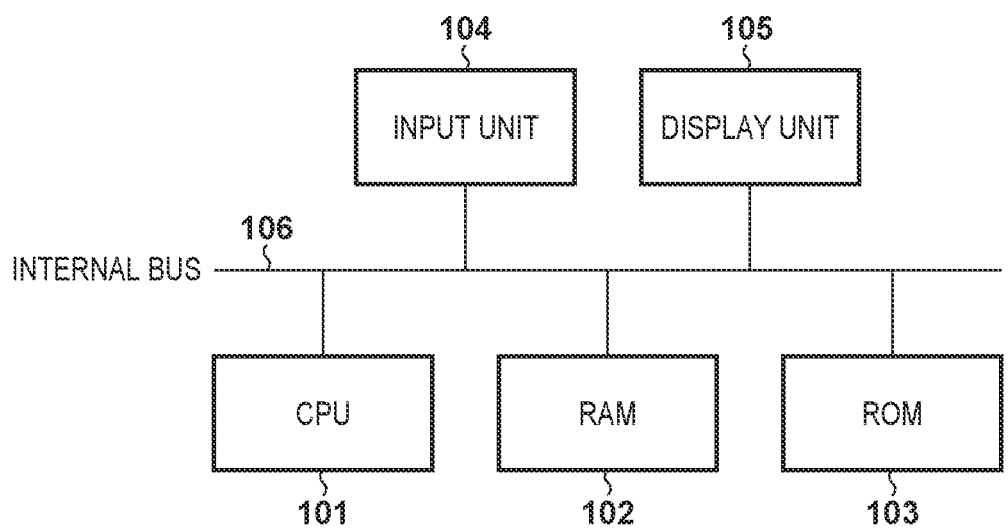
FIG. 1 is a view illustrating an example of a hardware configuration of an information processing apparatus according to an embodiment.

FIG. 1 is a view illustrating an example of a hardware configuration of an information processing apparatus according to the present embodiment. A CPU 101 controls the entire information processing apparatus using computer programs and data stored in a RAM 102 or a ROM 103. Note that the information processing apparatus has one or more dedicated pieces of hardware and/or GPU (Graphics Processing Unit) different from the CPU 101, and at least a part of processing by the CPU 101 may be performed by the GPU or the dedicated hardware. Examples of the dedicated hardware include an ASIC (application specific integrated circuit) and a DSP (digital signal processor).

The RAM 102 temporarily stores computer programs and data read out from the ROM 103, data externally supplied via an input unit 104, and the like. The ROM 103 holds computer programs and data that require no modification. The input unit 104 performs input of data from a controller for editing a camera path, a keyboard, a mouse, and the like. A display unit 105 is a display or the like that displays the GUI. An internal bus 106 is a bus that is responsible for exchanging data between each piece of hardware.

<Functional Configuration of Information Processing Apparatus>

Figure 2:
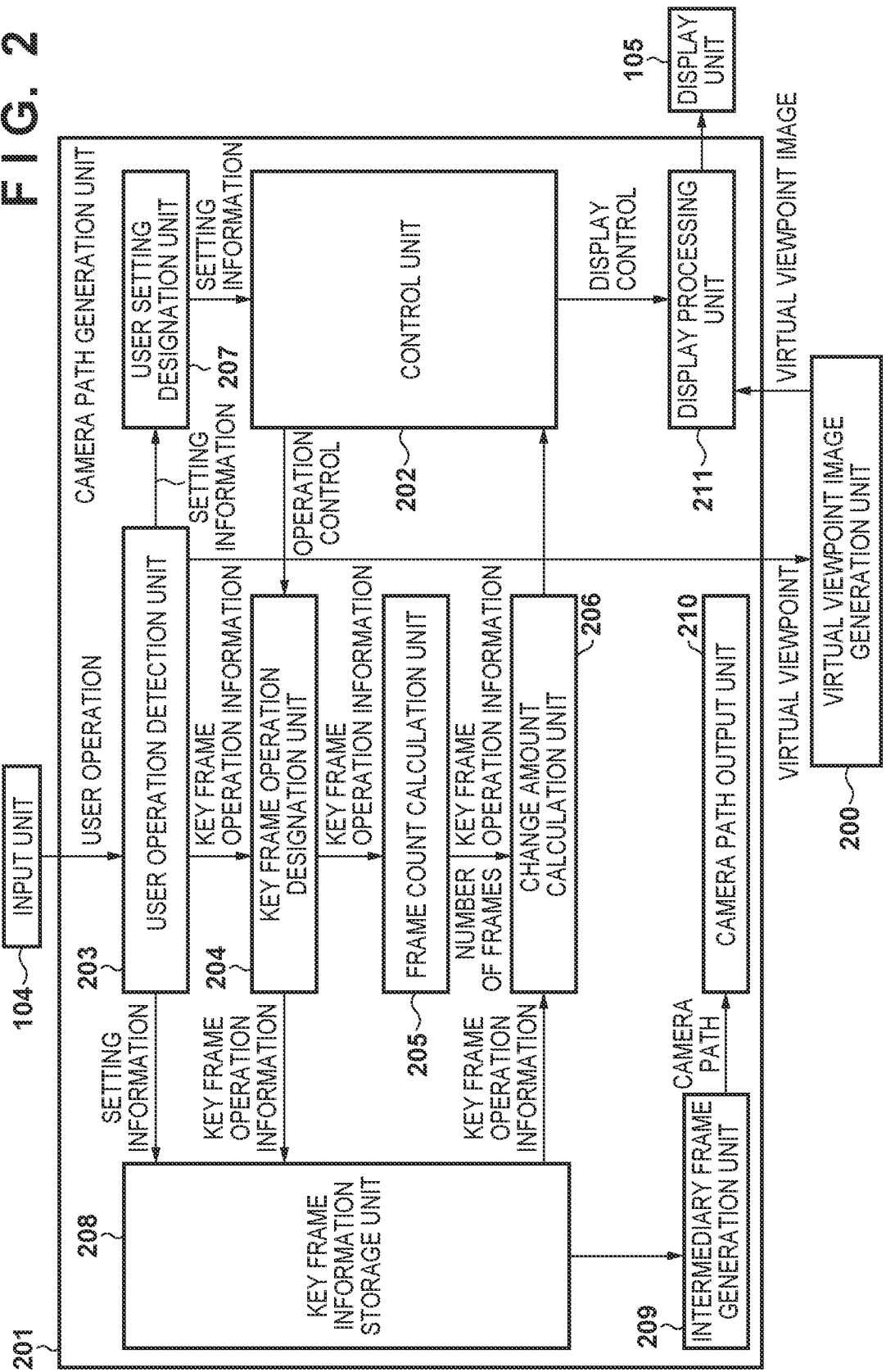
FIG. 2 is a view illustrating an example of a functional configuration of an information processing apparatus according to a first embodiment.

FIG. 2 is a view illustrating an example of a functional configuration of the information processing apparatus according to the present embodiment. The information processing apparatus according to the present embodiment is an apparatus for generating a virtual camera path by interpolation, which uses a plurality of key frames to be a reference of the virtual camera path indicating a path of positions of a virtual camera, and is configured to include a camera path generation unit 201. Note that that the information processing apparatus may further include a virtual viewpoint image generation unit 200.

The virtual viewpoint image generation unit 200 generates a virtual viewpoint image seen from a viewpoint of the virtual camera based on a plurality of images synchronously captured from multiple viewpoints. A virtual viewpoint image in the present embodiment is also called a free viewpoint video; however, it is not limited to an image that corresponds to a viewpoint that the user freely (arbitrarily) designated, and a virtual viewpoint image also includes, for example, an image that corresponds to a viewpoint that the user selected from a plurality of candidates and the like. Also, in the present embodiment, a case where virtual viewpoint designation is performed by user operation will be primarily described; however, virtual viewpoint designation may be automatically performed based on a result of image analysis or the like. Also, in the present embodiment, a case where the virtual viewpoint image is a video will be primarily described; however, the virtual viewpoint image may be a still image.

The viewpoint information used to generate a virtual viewpoint image is information that indicates the position and direction (viewing direction) of the virtual viewpoint. More specifically, the viewpoint information is a set of parameters that includes a parameter that indicates a three-dimensional position of the virtual viewpoint and a parameter that indicates a direction of the virtual viewpoint in pan, tilt, and roll directions. Note that the content of the viewpoint information are not limited to those described above. For example, the set of parameters as viewpoint information may include a parameter that indicates the size of a field of view (viewing angle) of the virtual viewpoint. Also, the viewpoint information may include a plurality of sets of parameters. For example, the viewpoint information may include a plurality of sets of parameters that respectively correspond to a plurality of frames configuring a virtual viewpoint video and may be information that indicates the position and facing of the virtual viewpoint at each of a plurality of consecutive points in time.

A virtual camera refers to a camera that is virtual and is different from a plurality of image capturing apparatuses actually installed around a region to be captured, and is a concept for conveniently explaining a virtual viewpoint related to generation of a virtual viewpoint image. In other words, the virtual viewpoint image can be regarded as an image captured from a virtual viewpoint set in a virtual space associated with a region to be captured. Then, the position and direction of the viewpoint in the virtual capturing can be represented as the position and direction of the virtual camera. In other words, in a case where it is assumed that a camera exists at a position of a virtual viewpoint set in a space, the virtual viewpoint image can be said to be an image simulating a captured image obtained from that camera. Additionally, in the present embodiment, content of temporal transition of a virtual viewpoint is expressed as a virtual camera path. However, it is not essential to use the concept of the virtual camera to realize the configuration of the present embodiment. That is, it suffices to set at least information representing a specific position in a space and information representing a specific direction in a space, and to generate a virtual viewpoint image in accordance with the set information.

Figure 3:
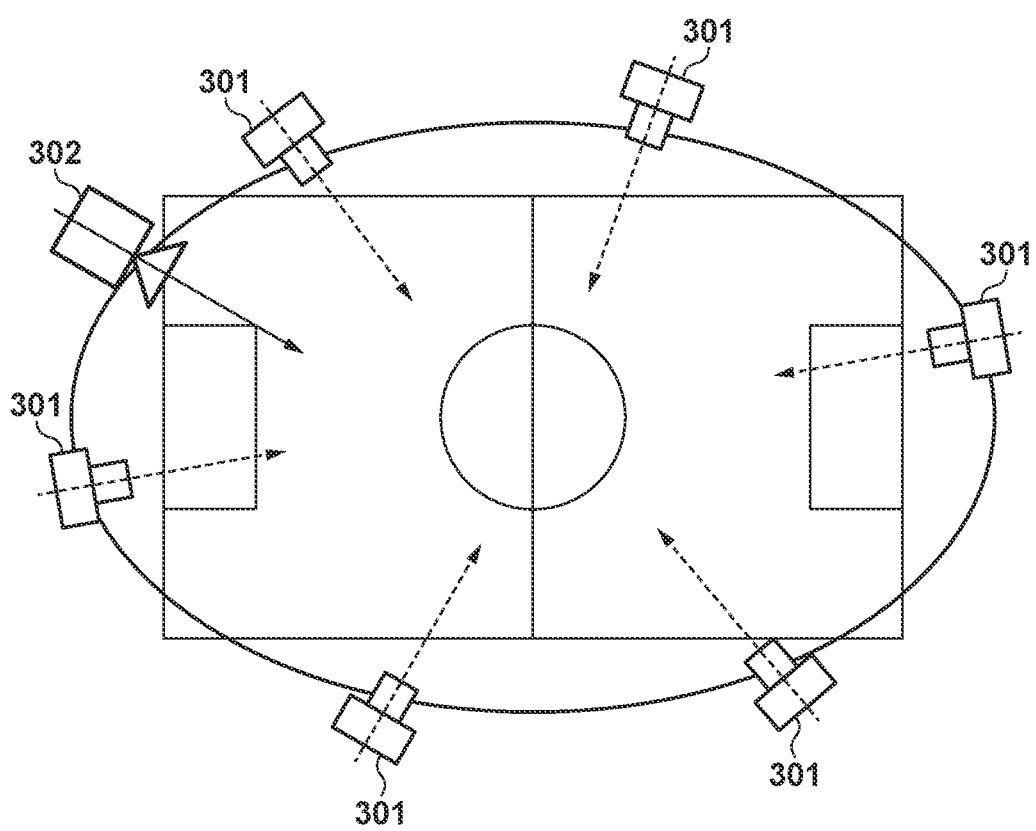
FIG. 3 is a view illustrating an example of an arrangement of a plurality of actual cameras surrounding an image capturing space according to the embodiment.

Here, an example of a virtual camera will be described with reference to FIG. 3. A plurality of actual cameras 301 are arranged to surround an image capturing space such as a stadium. These plurality of actual cameras 301 are set so as to perform synchronous capturing. A virtual camera 302 is capable of generating a virtual viewpoint image from a viewpoint that is different from any actual camera 301.

Next, an example of a method of generating a virtual viewpoint image will be described. Hereinafter, subjects, such as a player and a ball, whose positions change will be referred to as foregrounds. Also, subjects, such as a field (grass field), other than the foreground will be referred to as backgrounds. First, a plurality of captured images captured by the actual cameras 301 is separated into foregrounds and backgrounds. Then, a 3D form and position of the foregrounds, such as a player and a ball, are calculated from a plurality of separated foregrounds. Next, the foregrounds are reconstructed from the 3D form and position in accordance with the viewpoint of the virtual camera 302. Next, a single background is generated from a plurality of separated backgrounds. Then, a virtual viewpoint image is generated by compositing the reconstructed foregrounds on the generated background.

Note that it is possible to use the information processing apparatus to edit a camera path of a CG image. In such a case, a CG renderer is arranged in place of the virtual viewpoint image generation unit 200. The virtual camera 302 represents a viewpoint of the CG image and can be moved to a desired position within a CG space.

<Description of Camera Path>

The camera path generation unit 201 illustrated in FIG. 2 generates a camera path in accordance user operation. Here, a description will be given with regard to a camera path.

A camera path defines the movement of the virtual camera 302 in a video that is generated by playing back a plurality of virtual viewpoint images or CG images in order. This camera path is managed by frames, in a timeline. A frame holds information required for generating each image constituting a video. More specifically, a frame holds information of the time of a scene and the position/orientation of the camera. The time of a scene is expressed by, for example, a time code in which the time at which the game to be captured is started is set as 00 hour:00 minute:00 second:00 frame. The position of the camera is expressed by, for example, three coordinates, x, y, and z by setting an origin in the image capturing space. The orientation of the camera is expressed by, for example, three angles, pan, tilt, and roll. The number of the frames included in a timeline is determined according to the number of images reproduced per second (frame rate). For example, in a case where the frame rate is 60 frames/second, 60 frames are included in each second of the timeline.

There are two types of frame, a key frame and an intermediary frame, in camera path editing that uses key frames. Key frames are frames for which information is explicitly designated by the user that edits the camera path. Meanwhile, an intermediary frame is a frame between key frames and is a frame for which the camera path generation unit 201 decides the information by interpolating between the key frames. Furthermore, the key frames are classified into three types, a starting point, an ending point, and a middle point. A camera path includes one key frame (starting point), one key frame (ending point), and zero or more key frames (middle point). The information processing apparatus particularly targets camera paths that include one or more key frames (middle point). In other words, camera paths to be targeted are camera paths that include three or more key frames and between the key frame (starting point) and the key frame (ending point) are generation targets.

Figure 4:
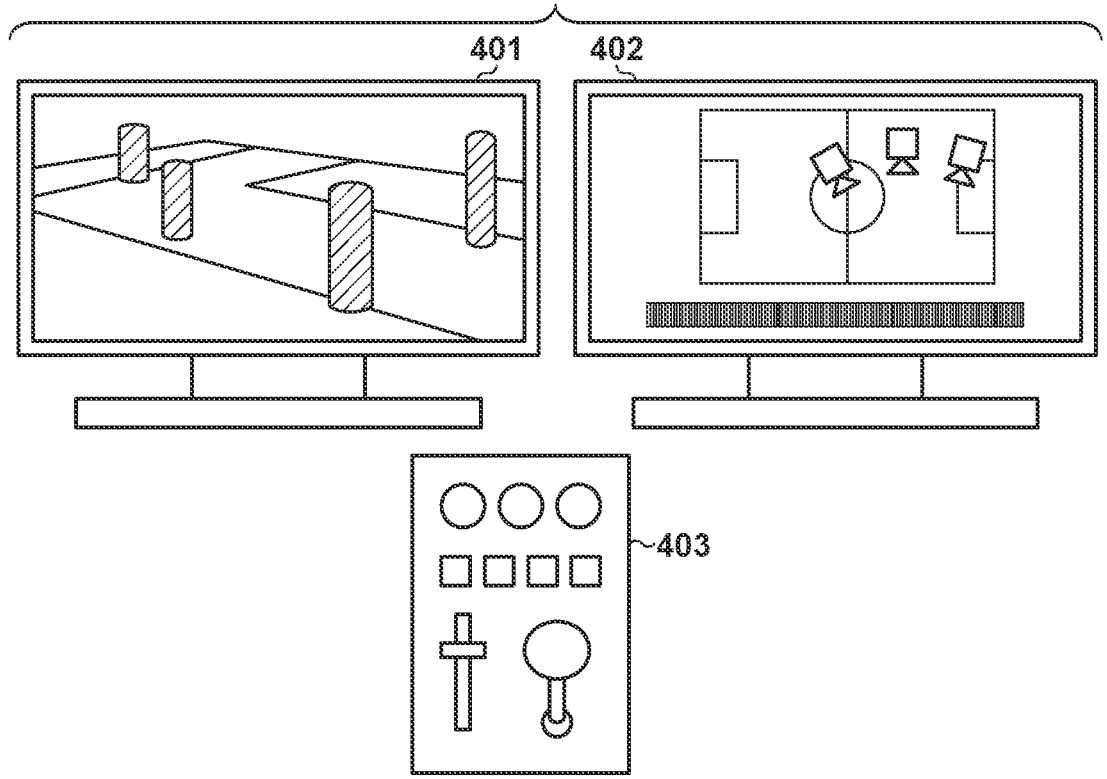
FIG. 4 is a view illustrating an example of a UI for editing a camera path according to the embodiment.

Here, an example of a GUI for editing a camera path is illustrated in FIG. 4. A virtual camera image display unit 401 displays an image that the virtual viewpoint image generation unit 200, which is illustrated in FIG. 2, generated (i.e., an image seen from the virtual camera 302). A GUI display unit 402 displays information regarding the camera path and the key frame, or the like. A camera path edit controller 403 is a controller that the user uses to edit a camera path.

Figure 5:
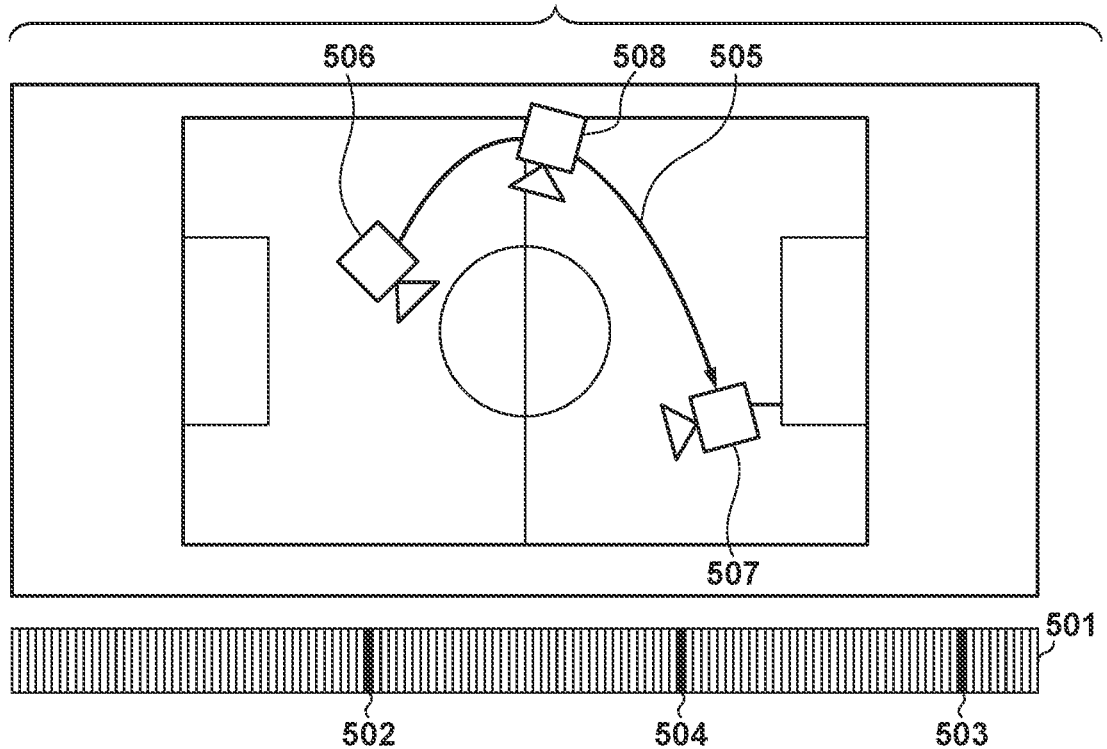
FIG. 5 is a view illustrating an example of a display on a GUI display unit for displaying information related to a camera path and key frames according to the embodiment.

An example of a display of the GUI display unit 402 is illustrated in FIG. 5. A timeline 501 displays each frame on a single time axis. In FIG. 5, there are three key frames, a key frame 502, a key frame 503, and a key frame 504. The key frame 502 is a key frame (starting point). The key frame 503 is a key frame (ending point). The key frame 504 is a key frame (middle point). Meanwhile, a motion path 505 represents the movement in the position/orientation of the camera in each frame. A reference numeral 506 indicates the position/orientation of the camera in the key frame 502. A reference numeral 507 indicates the position/orientation of the camera in the key frame 503. A reference numeral 508 indicates the position/orientation of the camera in the key frame 504.

Note that the camera path generation unit 201 constantly transmits to the virtual viewpoint image generation unit 200 the information of a frame to be edited by the user. The virtual viewpoint image generation unit 200 generates a virtual viewpoint image based on the information of a frame received from the camera path generation unit 201. The generated virtual viewpoint image is transmitted to the virtual camera image display unit 401, and then displayed. This makes it possible for the user to edit the camera path while confirming, at all times, the image seen from the virtual camera of the frame that is being edited.

The camera path generation unit 201 comprises a control unit 202, a user operation detection unit 203, a key frame operation designation unit 204, a frame count calculation unit 205, a change amount calculation unit 206, a user setting designation unit 207, a key frame information storage unit 208, an intermediary frame generation unit 209, a camera path output unit 210, and a display processing unit 211.

The control unit 202 controls operation of each functional block in the camera path generation unit 201. The user operation detection unit 203 detects each type of user operation inputted from the input unit 104. The key frame operation designation unit 204 acquires a user input related to key frame operation from among the user operations detected by the user operation detection unit 203 and designates key frame information. Here, information related to key frame operation is, for example, time of a key frame, the position/orientation of the key frame, camera control such as a zoom ratio, and the playback speed between key frames.

The designation of time information of a key frame is processing of adding a key frame to the time that the user has designated on the timeline 501. The user operates (advances or reverses) the time and designates the desired time using the camera path edit controller 403. When the user operates the time, a virtual viewpoint image that corresponds to that time is displayed on the virtual camera image display unit 401. The user can easily designate the time of the desired scene, such as when the player made a pass, by operating while looking at the virtual camera image display unit 401. The key frame that the user added is displayed on the timeline 501 as, for example, the key frame 502, the key frame 503, and the key frame 504.

The designation of the position/orientation information of a key frame is processing of designating the position/orientation of a camera of a key frame in accordance with user operations. The user designates the desired position by moving the camera back and forth, left and right, and up and down using the camera path edit controller 403. Also, the user rotates the camera in a pan, tilt, and roll directions and designates the desired orientation using the camera path edit controller 403. When the user operates the position/orientation of the camera, a virtual viewpoint image that corresponds to that position/orientation is displayed on the virtual camera image display unit 401. The user can easily designate the desired position/orientation of the camera by operating while looking at the virtual camera image display unit 401. The positions/orientations of the cameras of the key frames that the user designated are displayed as position/orientation 506, position/orientation 507, and position/orientation 508. Note that the position/orientation 506 of the camera is the positions/orientation of the camera of the key frame 502. The position/orientation 508 of the camera is the position/orientation of the camera of the key frame 504. The position/orientation 507 of the camera is the position/orientation of the camera of the key frame 503.

The designation of camera control of a key frame is processing of designating camera control such as designation of the zoom ratio of the camera of a key frame in accordance with user operations. The user performs control of the zoom ratio of the camera using the camera path edit controller 403. When the user performs operation of the zoom ratio of the camera, the zoom ratio of the camera changes. In a case where zoom ratios are different between key frames, a camera path whose zoom ratio between the key frames has been changed is generated.

The designation of the playback speed between key frames is processing of designating the speed between key frames in accordance with user operations. For example, it is designation such as setting the playback speed between certain key frames to a slow playback of 0.5× speed. The virtual camera will move between the key frames at a designated playback speed.

Next, the frame count calculation unit 205 performs processing of calculation (specifying) the number of frames between key frames. The calculation of the number of frames is obtained by the times of key frames, the frame rate, and the playback speed between those key frames. For example, in a case where ×0.5 speed is assigned to between the key frames whose key frame times are 00 hour:00 minute:00 second:00 frame and 00 hour:00 minute:10 seconds:30 frames in a video of 60 frames/sec, the number of frames is "(10 seconds×60 frames+30 frames)×2=1260 frames".

The change amount calculation unit 206 is a processing unit for obtaining (specifying) an amount of change of a virtual camera parameter of a virtual camera (e.g., the position and/or orientation of a virtual camera) between key frames. The amount of change here is an amount of change per unit of time and, more specifically, represents an amount of change per frame based on the number of frames calculated by the frame count calculation unit 205.

The user setting designation unit 207 acquires from the user operation detection unit 203 setting information from the user for the camera path generation unit 201 among user operations detected by the user operation detection unit 203 and notifies it to the control unit 202.

The key frame information storage unit 208 stores key frame information that the user set. The intermediary frame generation unit 209 generates an intermediary frame based on the key frame information stored in the key frame information storage unit 208 and then generates a camera path. The generation of the intermediary frame is performed by interpolating the position/orientation between key frames with a curved line. A method of interpolating the position of a camera is, for example, linear interpolation, Bezier interpolation, or the like. Also, a method of interpolating the orientation of a camera is, for example, linear interpolation, a spherical linear interpolation, or the like. The interpolated curved line is the motion path 505.

The camera path output unit 210 outputs a camera path that indicates the movement of the virtual camera that includes the intermediary frame generated by the intermediary frame generation unit 209. The generated camera path is used for the generation of a video clip.

The display processing unit 211 performs processing of displaying information that indicates the amount of change calculated by the change amount calculation unit 206 on the display unit 105. The display processing unit 211 performs processing of displaying an amount of change on, for example, the virtual camera image display unit 401 or the GUI display unit 402 of FIG. 4. The processing executed in the display processing unit 211 is controlled by the control unit 202.

<Processing>

Figure 6:
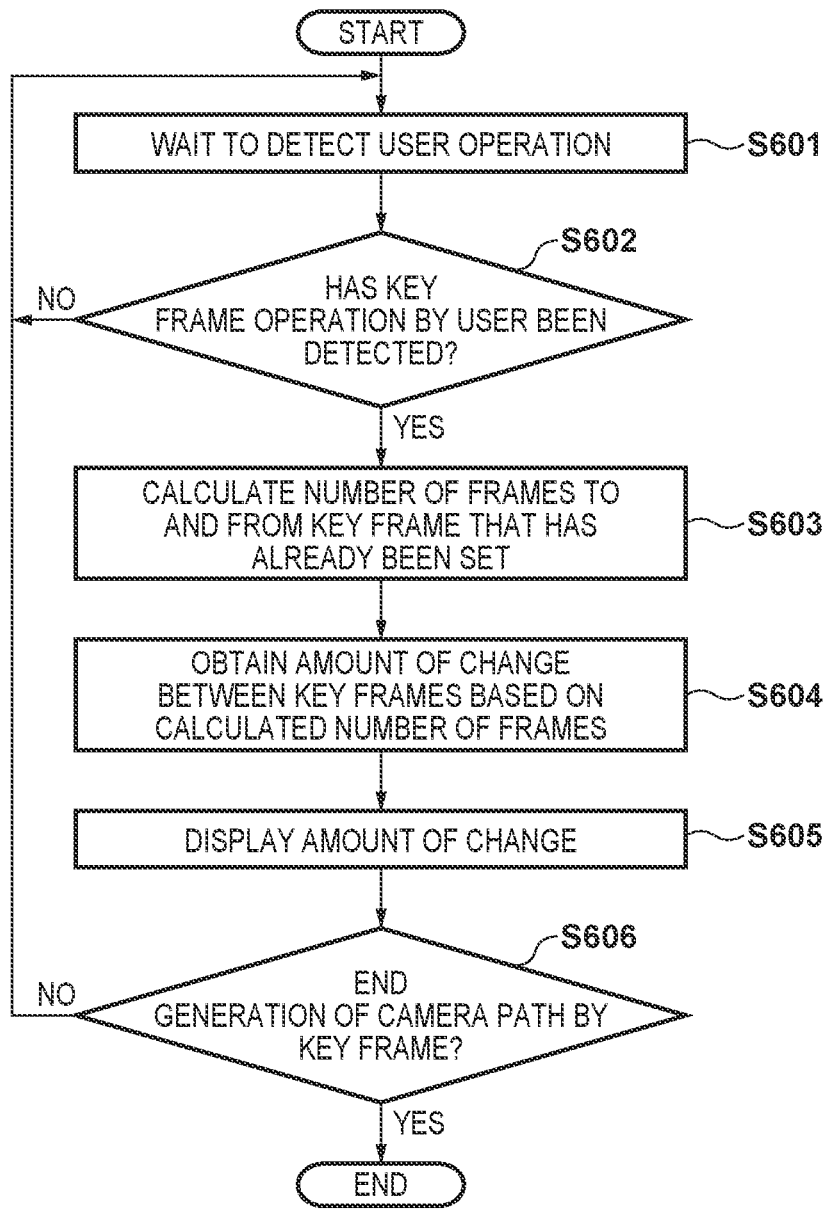
FIG. 6 is a flowchart illustrating a procedure of processing that the information processing apparatus executes according to the first embodiment.

Next, a procedure of processing that the information processing apparatus according to the first embodiment executes will be described with reference to a flowchart of FIG. 6. The processing of FIG. 6 is processing of displaying the amount of change during operation of key frames.

In step S601, the user operation detection unit 203 detects operation by the user. In step S602, the key frame operation designation unit 204 determines whether or not the user operation detected in step S601 is a key frame operation. In a case where it is determined to be a key frame operation, the processing advances to step S603. Meanwhile, in a case where it is determined not to be a key frame operation, the processing returns to step S601.

In step S603, the frame count calculation unit 205 calculates (specifies) the number of frames between the key frame that has already been set and the key frame to be operated. In step S604, the change amount calculation unit 206 calculates (specifies) the amount of change in the virtual camera parameters between the key frames based on the number of frames calculated in step S603. The amount of change here is the amount of change in the position and/or orientation of the virtual camera. Note that it may also be the amount of change in the zoom ratio. Also, it may be a combination of some or all of these.

Figure 7:
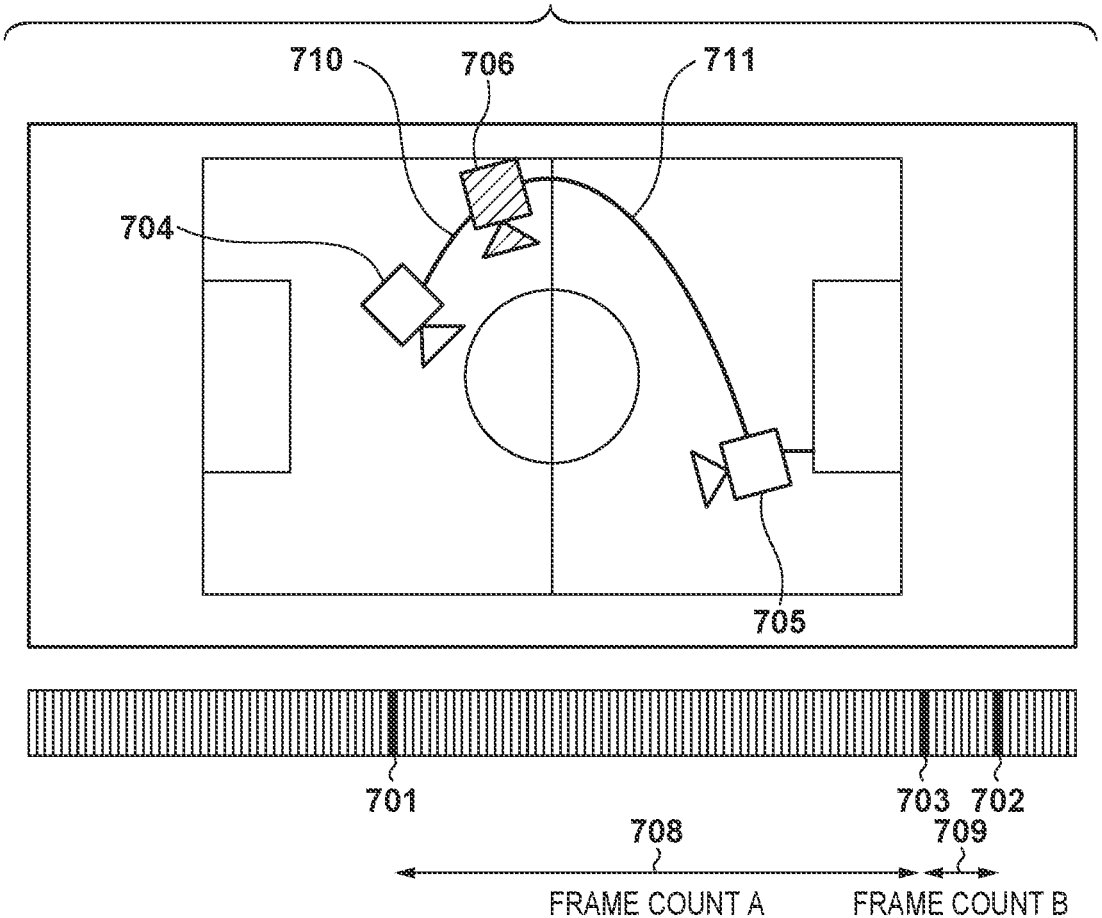
FIG. 7 is a view describing an operation for inserting a key frame according to the first embodiment.

The processing in steps S603 and S604 will be described in detail here while referencing to FIG. 7. FIG. 7 is a view describing operation for when inserting a new key frame 706 in a state in which a key frame 704 and a key frame 705 have already been set. The time on the timeline that corresponds to the key frame 704 is a reference numeral 701 and the time on the timeline that corresponds to the key frame 705 is a reference numeral 702. The key frame 706 is in a state in which the user is performing setting and, at this time, is indicated as a temporary position.

In step S603, the number of frames between the key frames is calculated. In the example of FIG. 7, the number of frames between the key frame 704 and the key frame 706 is a frame count A, which is indicated by a reference numeral 708, and the number of frames between the key frame 705 and the key frame 706 is a frame count B, which is indicated by a reference numeral 709. The number of frames, as described above, is calculated based on the time, frame rate, and playback speed.

The amount of movement between the key frame 704 and the key frame 706 is a movement amount A and the amount of movement between the key frame 704 and the key frame 705 is a movement amount B. The amount of change calculated in step S604 is, for example, a value of this amount of movement divided by the number of frames. Accordingly, a change amount A between the key frame 704 and the key frame 706 is the change amount A=the movement amount A/the frame count A and a change amount B between the key frame 705 and the key frame 706 is the change amount B=the movement amount B/the frame count B. Note that in FIG. 7, the amount of movement is simply illustrated as a one-dimensional distance however, the present invention is not limited to this. In FIG. 7, a state in which the movement amount B is greater than the movement amount A and the frame count A is greater than the frame count B is illustrated. Accordingly, the change amount A indicates a small value and indicates that a motion path transitions by a small amount of movement over a long period of time. Meanwhile, the change amount B indicates a large value and indicates a steep motion path over a short amount of time.

Also, the amount of change per unit of time to be calculated here is not limited to the value of the amount of movement of the position of the virtual camera divided by the number of frames. For example, a value of the amount of change in the orientation of the virtual camera and the amount of change in the zoom ratio divided by the number of frames may be used for the amount of change per unit of time.

Figure 8:
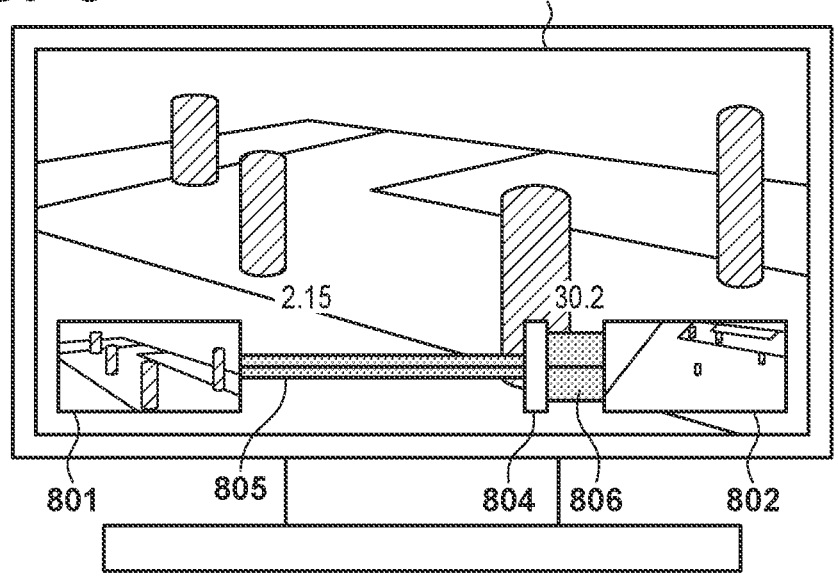
FIG. 8 is a view illustrating an example of displaying information that indicates an amount of change by superimposing it on the virtual camera image display unit according to the first embodiment.

In step S605, the display processing unit 211 displays the amount of change calculated in step S604. Here, FIG. 8 is a view illustrating an example in which the amount of change calculated in step S604 is displayed superimposed on the virtual camera image display unit 401 illustrated in FIG. 4. The information such as key frames illustrated in FIG. 8 corresponds to the information illustrated in FIG. 7.

Reference numeral 801 and 802 of FIG. 8 are preset key frames. The key frame 801 corresponds to the key frame 704 of FIG. 7 and the key frame 802 corresponds to the key frame 705 of FIG. 7. A reference numeral 803 is a currently operated virtual viewpoint, displays an image seen from that virtual viewpoint, and corresponds to the key frame 706 of FIG. 7. An indicator 804 indicates a relative location of the key frame 706 on the timeline. The change amount A between the key frame 704 and the key frame 706 illustrated in FIG. 7 is illustrated by a graph 805 of FIG. 8 and the change amount B between the key frame 705 and the key frame 706 of FIG. 7 is illustrated by a graph 806 of FIG. 8. In the illustrated example, the change amount A=2.15 and the change amount B=30.2. Accordingly, it is possible to recognize that the change between the key frame 705 and the key frame 706 of FIG. 7 is large. As it is understood from FIG. 8, visually displaying the magnitude of the amount of change makes it possible to easily grasp the change in the movement between key frames; accordingly, setting the key frame 803 for which the plan is to perform insertion at the present time makes it possible for the user to easily determine what kind of a camera path it will be. Note that the example of a display illustrated in FIG. 8 is an example and the display mode thereof is not limited to the illustrated example.

In step S606, the key frame operation designation unit 204 determines whether or not generation of the camera path has ended. For example, in a case where an end operation has been performed by the user, it may be determined that generation has ended. In a case where this step is Yes, the series of processing is ended. Meanwhile, in a case where this step is No, the processing returns to step S601 and detection of user operation is started again and the series of processing is repeated.

As described in the above, in the first embodiment, the amount of change in the position and/or orientation of the virtual camera, which are virtual camera parameters of a key frame, is calculated and is notified to the user by visually displaying on a display unit and the like. In other words, when the user sets a key frame, information that makes it possible to determine what kind of a camera path it will be (whether the change is too large and the camera path will be such from which it is hard to view) due to that key frame will be notified to the user.

This makes it possible to easily confirm the amount of change in the position/orientation of the virtual camera parameter at the time of inserting a key frame; accordingly, it becomes possible for the user to perform setting of a desired key frame without performing a preview display of a camera path.

Note that in the present embodiment, the amount of movement was given as an example of an amount of change in key frames; however, the present invention is not limited to this. Configuration may be taken so as to display the amount of change per unit of time, which is an amount indicating a change in the position/orientation of the virtual camera or the amount of change in zoom divided by the number of frames.

Second Embodiment

In a second embodiment, an example in which in a case where a change that is greater than or equal to the amount of change set in advance occurs, that is notified to the user will be described. The hardware configuration and the functional configuration of the information processing apparatus according to a second embodiment is the same as the first embodiment; accordingly, description will be omitted.

<Processing>

Figure 9:
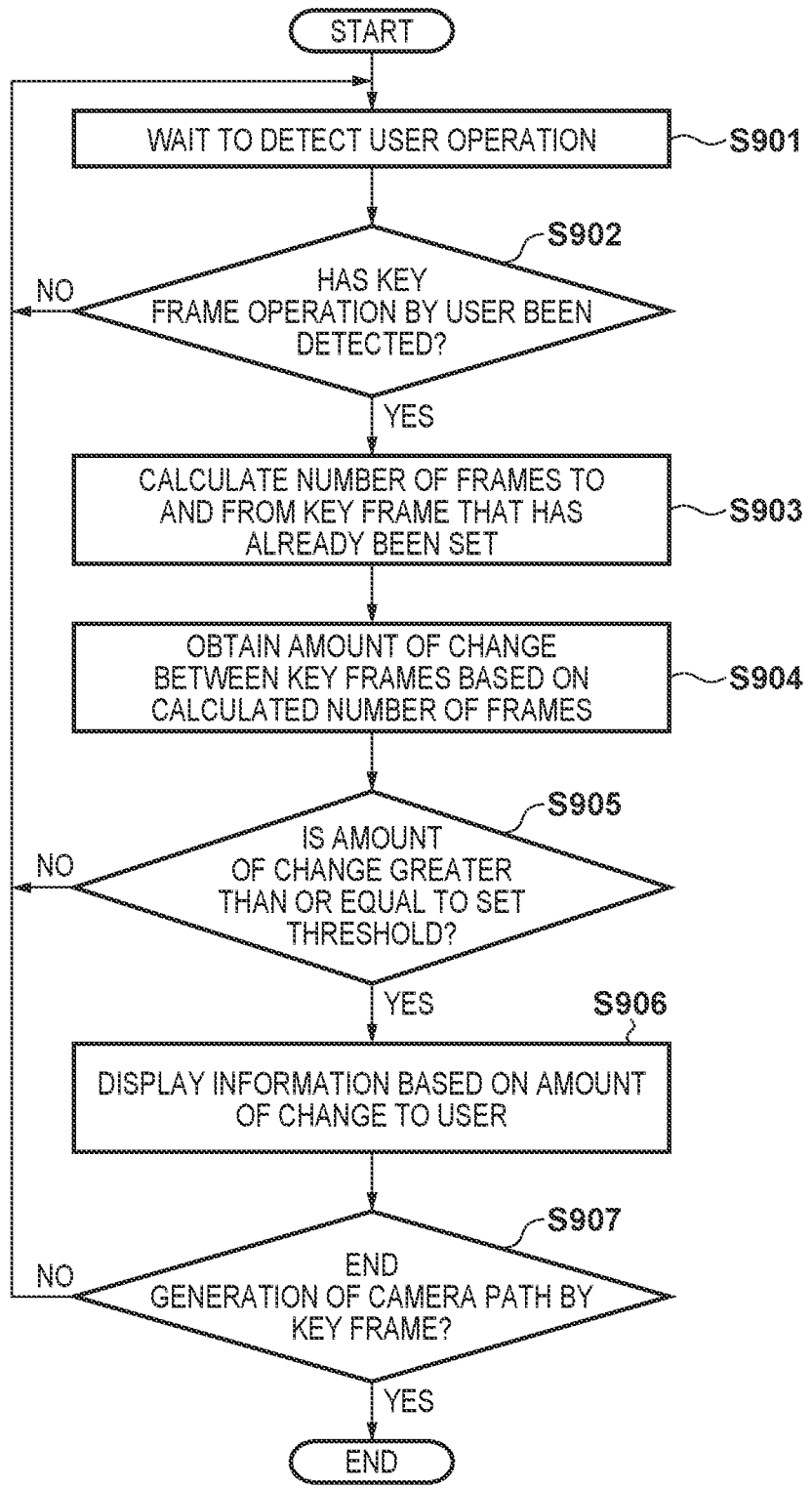
FIG. 9 is a flowchart illustrating a procedure of processing that the information processing apparatus executes according to a second embodiment.

Next, a procedure of processing that the information processing apparatus according to the present embodiment executes will be described with reference to a flowchart of FIG. 9. Note that it is assumed that a predetermined threshold for the amount of change is set in advance prior to the start of this flow. The setting of a threshold, for example, has been executed for the control unit 202 via the user setting designation unit 207 illustrated in FIG. 2. Note that within this flow, each of the processing of steps S901 to S904 and S907 are the same as the steps S601 to S604, and S606 described in FIG. 6; accordingly description will be omitted. The differences from FIG. 6 will be primarily described in the following.

In step S905, the display processing unit 211 determines whether or not the amount of change calculated in step S904 is greater than or equal to the predetermined threshold set in advance. In a case where the amount of change is greater than or equal to the predetermined threshold, the processing advances to step S906. Meanwhile, in a case where the amount of change is less than the predetermined threshold, the processing returns to step S901.

Figure 10:
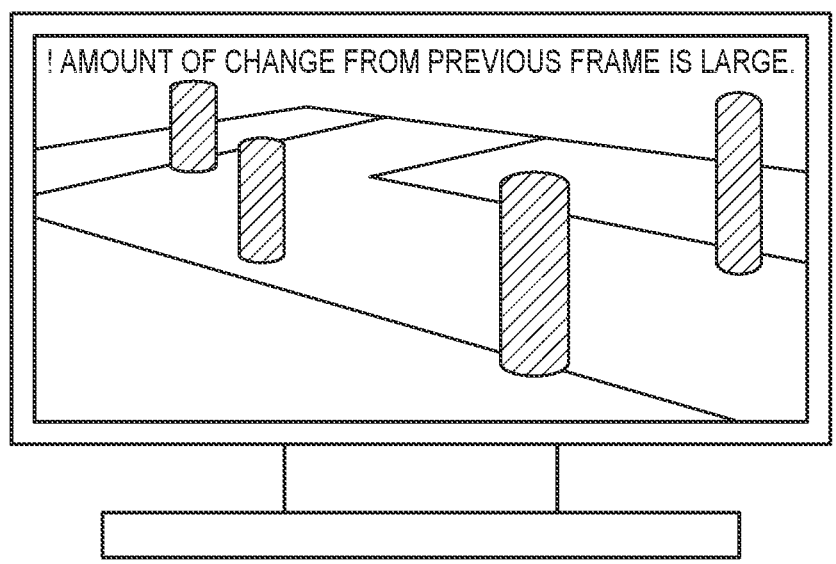
FIG. 10 is a view illustrating an example of a display for warning a user that the amount of change is large according to the second embodiment.

In step S906, the display processing unit 211, as the amount of change is greater than or equal to the predetermined threshold, notifies the user with a warning. Here, FIG. 10 is a view illustrating an example of a method of notifying a warning. In FIG. 10, a warning display 1001 is a text, "AMOUNT OF CHANGE FROM PREVIOUS FRAME IS LARGE." This is displayed superimposed on the virtual camera image display unit 401 illustrated in FIG. 4. Alternatively, configuration may be taken so as to not limit to a display and notify a warning using audio.

As described in the above, in the second embodiment, in a case where the amount of change is greater than or equal to the preset threshold, information indicating that is notified to the user. This makes it possible to easily confirm the effect, on the camera path, of the amount of change at the time of inserting a key frame; accordingly, it becomes possible for the user to perform desired key frame setting.

Third Embodiment

In a third embodiment, an example in which in a case where the amount of change is greater than or equal to a preset threshold, key frame setting is prohibited will be described. It is an example in which the amount of change is not explicitly notified to the user but in a case where the amount of change is greater than or equal to the threshold, it is notified that the amount of change is large by prohibiting the key frame setting itself. The hardware configuration and the functional configuration of the information processing apparatus according to the third embodiment are the same as the first embodiment; accordingly, description will be omitted.

<Processing>

Figure 11:
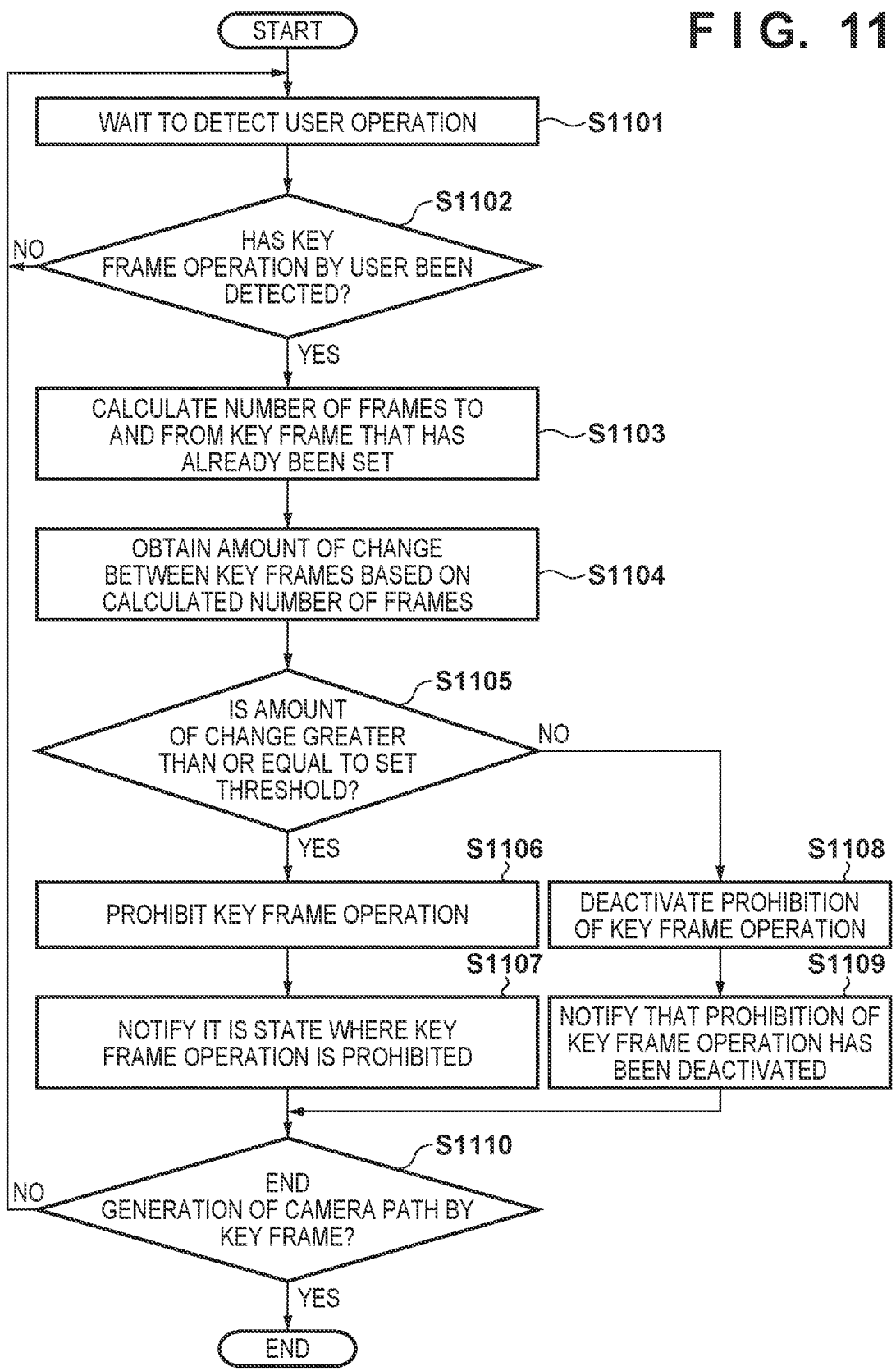
FIG. 11 is a flowchart illustrating a procedure of processing that the information processing apparatus executes according to a third embodiment.

Next, a procedure of processing that the information processing apparatus according to the present embodiment executes will be described with reference to a flowchart of FIG. 11. Note that it is assumed that a predetermined threshold for the amount of change is set in advance prior to the start of this flow. The setting of a threshold, for example, has been executed for the control unit 202 via the user setting designation unit 207 illustrated in FIG. 2. Note that within this flow, each of the processing of steps S1101 to S1105 and S1110 are the same as the steps S901 to S905, and S907 described in FIG. accordingly description will be omitted. The differences from FIG. 9 will be primarily described in the following. In a case where it is Yes in step S1105, the processing advances to step S1106. Meanwhile, in a case where it is No in step S1105, the processing advances to step S1108.

In step S1106, the control unit 202 instructs the key frame operation designation unit 204 to prohibit the key frame designation operation. In other words, the current key frame designation operation by user operation is cancelled.

Figure 12:
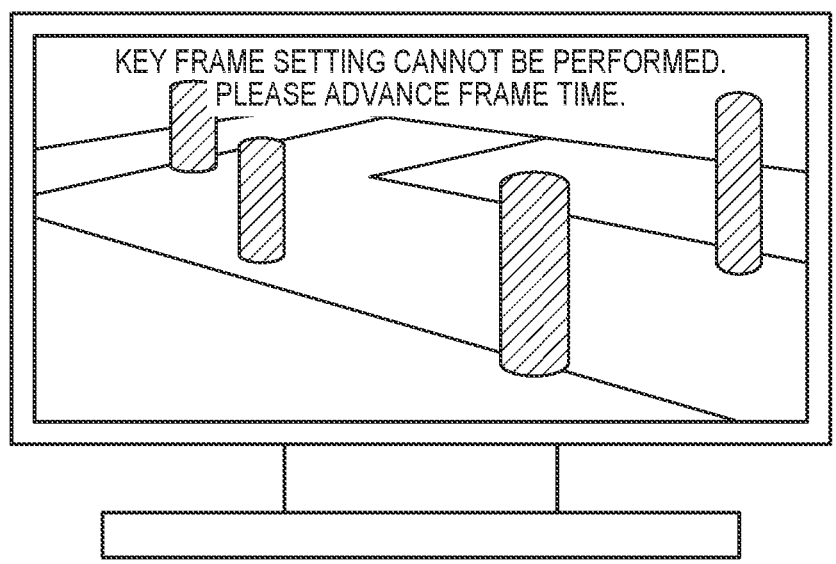
FIG. 12 is a view illustrating an example of a notification that it is a state in which a key frame designation operation is prohibited according to the third embodiment.

In step S1107, the display processing unit 211 performs notification to the user by displaying information indicating that it is a state in which a key frame designation operation by the user is prohibited. Here, an example of a notification is illustrated in FIG. 12. In FIG. 12, a message "KEY FRAME SETTING CANNOT BE PERFORMED. PLEASE ADVANCE FRAME TIME." is displayed. Note that this display does not need to be performed at all times and may be displayed when the user executes a key frame designation operation. Then, the processing advances to step S1110.

In step S1108, the control unit 202 instructs the key frame operation designation unit 204 to release the prohibition of key frame designation operation. Note that it is not the prohibited state, the current released state is maintained.

In step S1109, the display processing unit 211 performs notification to the user by displaying information indicating that the state is a released state in which the prohibition of key frame designation operation by the user is released. Similarly to FIG. 12, configuration may be taken so as to display a message indicating that key frame designation operation is not prohibited. Note that a released state does not necessarily have to be notified. In other words, this step may be skipped. Then, the processing advances to step S1110. The above is the series of processing of FIG. 11.

As described in the above, in the third embodiment, in a case where the amount of change is greater than or equal to the threshold, processing of prohibiting key frame designation operation by the user is performed. This makes it possible to prevent setting of a key frame that does not result in a desired camera path; accordingly, it is possible to improve to usability.

Fourth Embodiment

In a fourth embodiment, an example in which abnormality in image quality of a virtual viewpoint image in a camera path is detected and then a display indicating abnormality is performed will be described. Here, abnormality in image quality is a phenomenon that is caused by a difference in the playback speed of a virtual viewpoint and the frame rate of captured content and in which, for example, a subject is displayed blurry. Description of this phenomenon will be performed with reference to FIG. 13.

Figure 13:
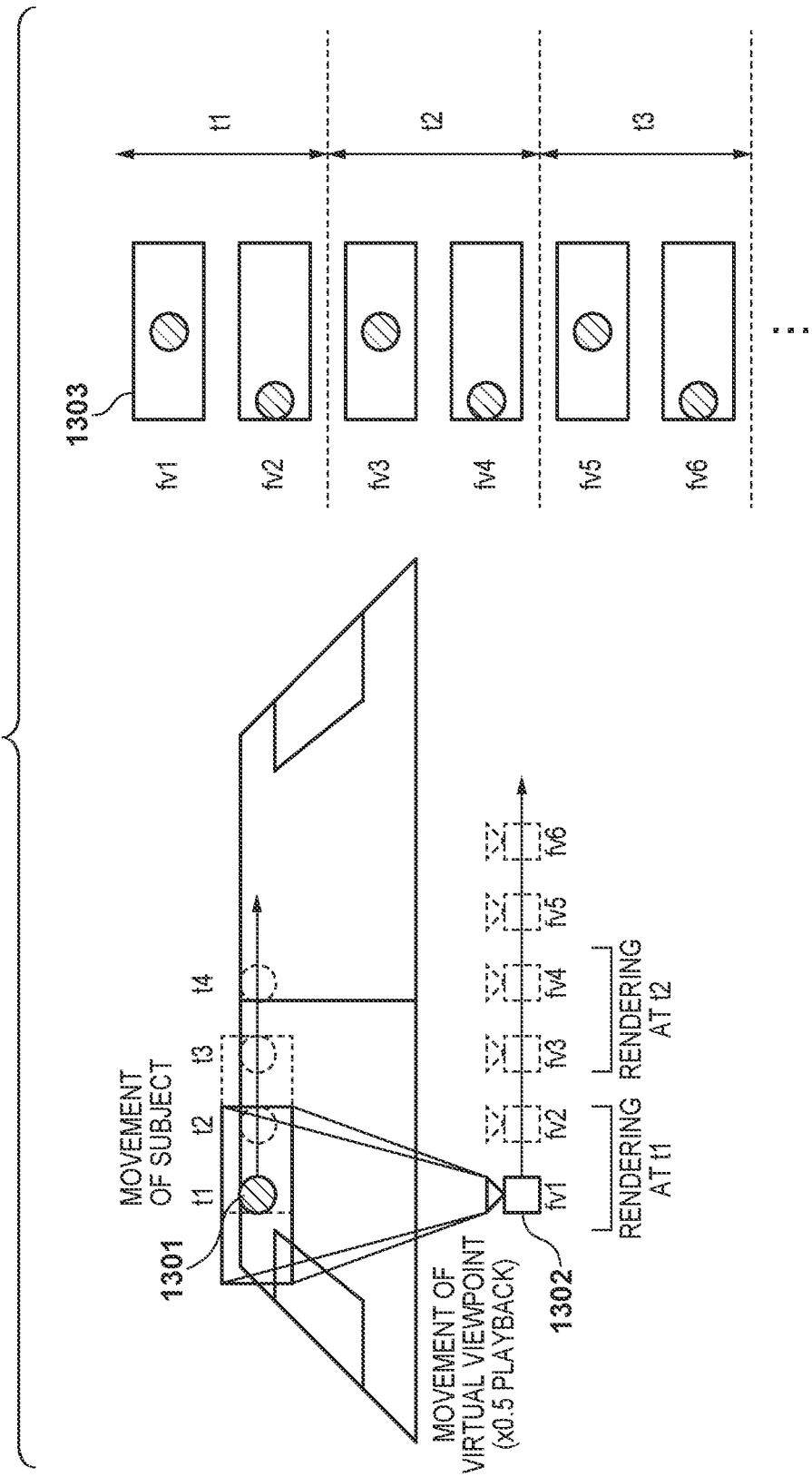
FIG. 13 is a view describing image quality abnormality in a virtual viewpoint image according to a fourth embodiment.

FIG. 13 is a view illustrating the movement of the subject, the movement of the virtual viewpoint, and the generated virtual viewpoint image. A reference 1301 is a subject (ball) used for the sake of descriptive convenience, and the subject 1301 is moving from left to right in the drawing. Each of t1 to t4 indicates the time of capturing. For example, in a case where the capturing was performed on a 60 fps camera, the interval between t1 and t2 is 1/60 seconds. A reference numeral 1302 indicates the virtual viewpoint, and fv1 to fv6 indicate the movement of the virtual viewpoint. In the example of FIG. 13, the virtual viewpoint moves in parallel to the ball which is the subject. Also, the virtual viewpoint image is generated to be slow at 0.5× speed. In such a case, the virtual viewpoint is generated to be at 0.5× speed of the time (t1 to t4) of the captured content; accordingly, rendering for the virtual viewpoint image of fv1 and fv2 needs to be performed with the t1 capturing content. Similarly, rendering for the virtual viewpoint image of fv3 and fv4 is performed with the t2 capturing content, and rendering for the virtual viewpoint image of fv5 and fv6 is performed with the t3 capturing content.

A reference numeral 1303 is a view indicating virtual viewpoint images generated with each virtual viewpoint from fv1 to fv6. The virtual viewpoint fv1 and the virtual viewpoint fv2 are generated from the capturing content of the same time t1; accordingly, the subject remains unmoving and only the virtual viewpoint moves. Then, when moving from the virtual viewpoint fv2 to the virtual viewpoint fv3, the time transition to t2; accordingly, a virtual viewpoint is generated in a state in which the subject has moved. In a case where the virtual viewpoint moves in parallel with the movement of the subject, the subject repeatedly moves back and forth as illustrated in 1303 accordingly, the subject is displayed blurry.

<Functional Configuration of Information Processing Apparatus>

Figure 14:
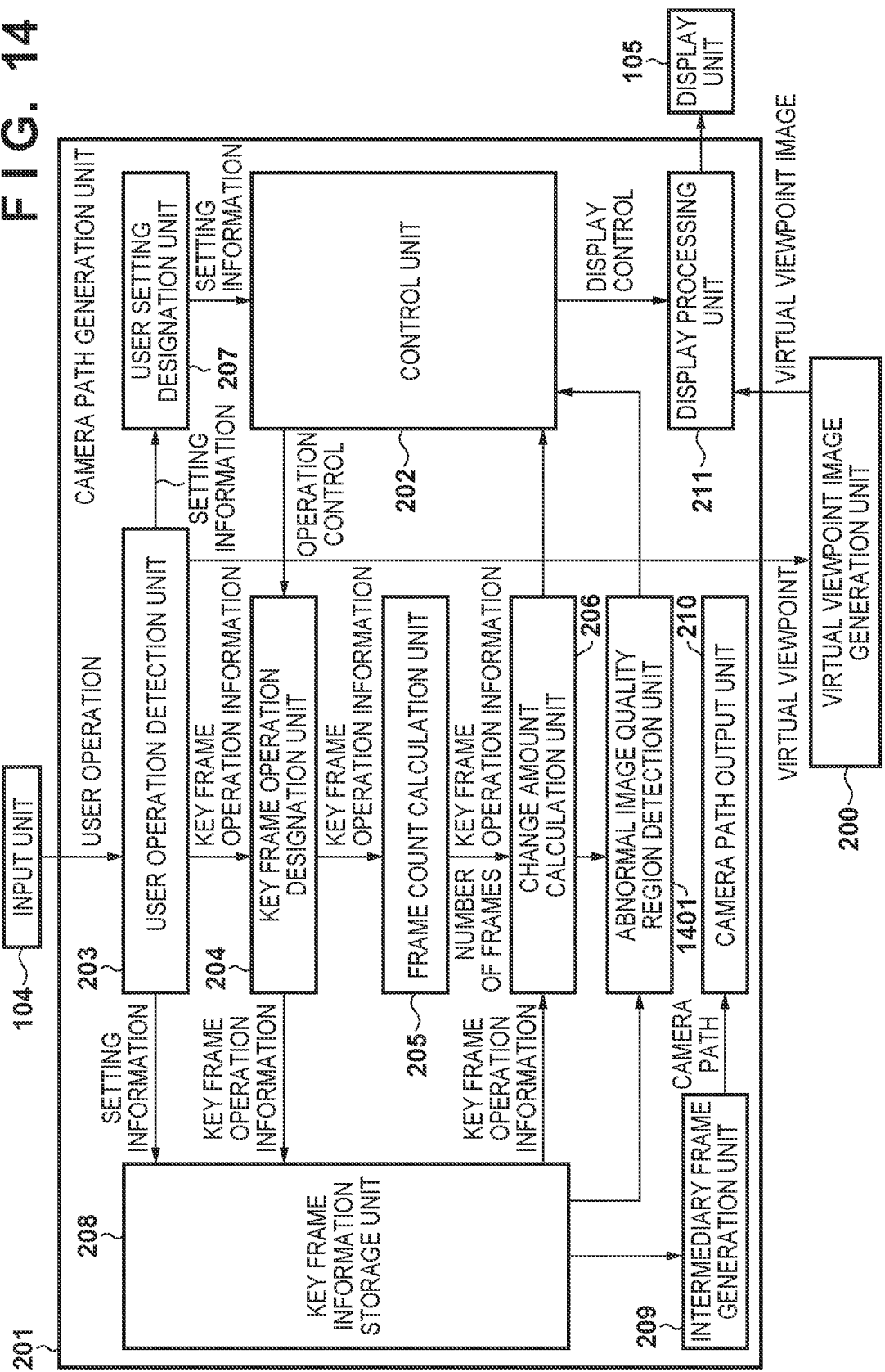
FIG. 14 is a view illustrating an example of a functional configuration of an information processing apparatus according to a fourth embodiment.

A functional configuration of the information processing apparatus according to the present embodiment will be described with reference to FIG. 14. The configuration elements that are the same as the configuration elements described in the first embodiment has been assigned the same reference numerals and detailed description will be omitted. Note that the hardware configuration of the information processing apparatus according to the third embodiment is the same as the first embodiment accordingly, description will be omitted. The camera path generation unit 201 according to the present embodiment comprises an abnormal image quality region detection unit 1401 in addition to the configuration illustrated in FIG. 2.

The abnormal image quality region detection unit 1401 detects abnormality in image quality such as blurring of the subject regarding the virtual viewpoint image on the virtual camera path based on key frame information stored in a key frame information storage unit 206.

<Processing>

Figure 15:
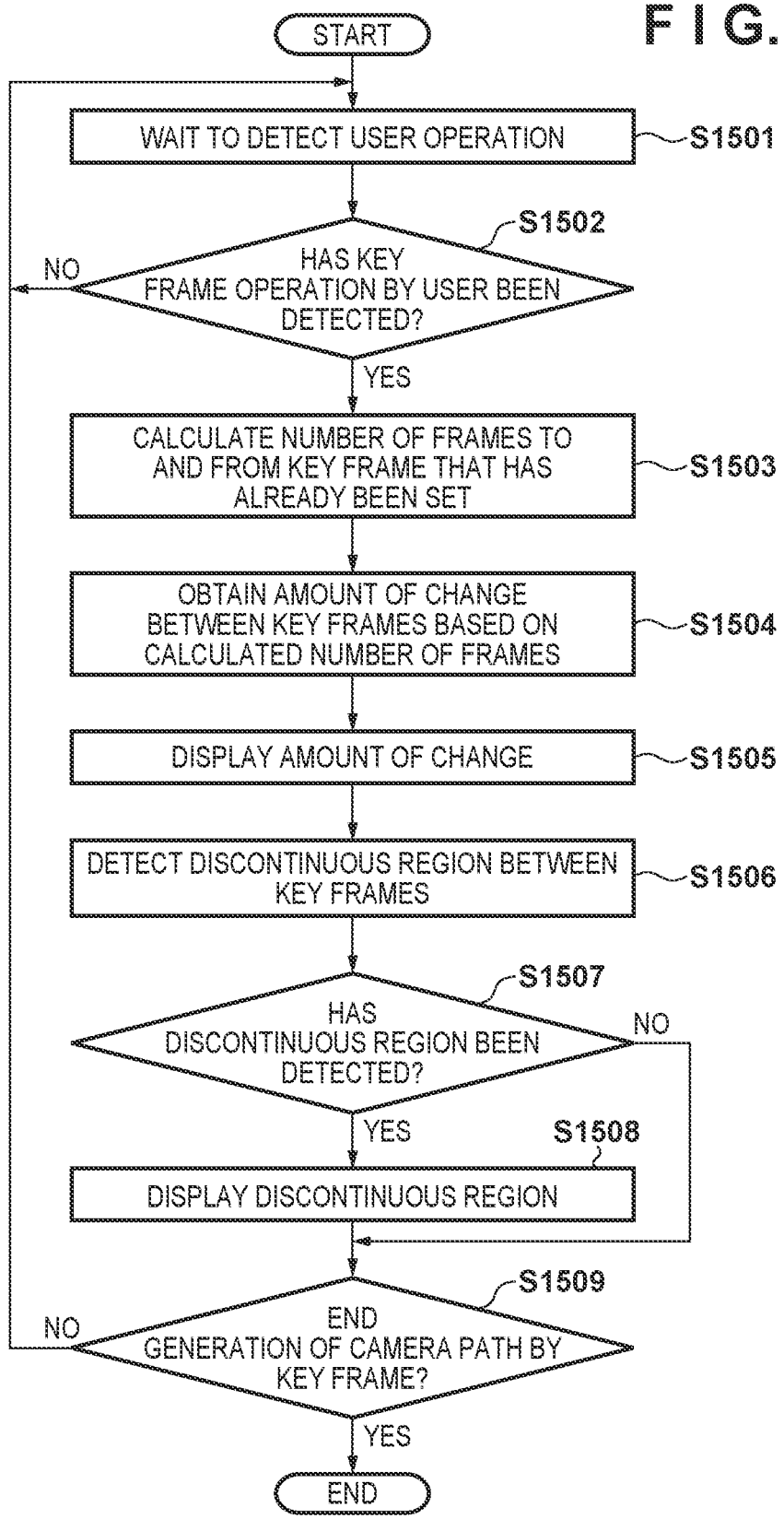
FIG. 15 is a flowchart illustrating a procedure of processing that the information processing apparatus executes according to the fourth embodiment.

Next, a procedure of processing that the information processing apparatus according to the present embodiment executes will be described with reference to a flowchart of FIG. 15. Note that within this flow, each of the processing of steps S1501 to S1505 and S1509 are the same as the steps S601 to S605, and S606 described in FIG. 6; accordingly description will be omitted. The differences from FIG. 2 will be primarily described in the following.

In step S1506, the abnormal image quality region detection unit 1401 performs processing of detecting a discontinuous region between key frames as an abnormal image quality region. In step S1507, the abnormal image quality region detection unit 1401 determines whether or not a discontinuous region has been detected. In a case where this step is Yes, the processing advances to step S1508. Meanwhile, in a case where this step is No, the processing advances to step S1509.

Figure 16:
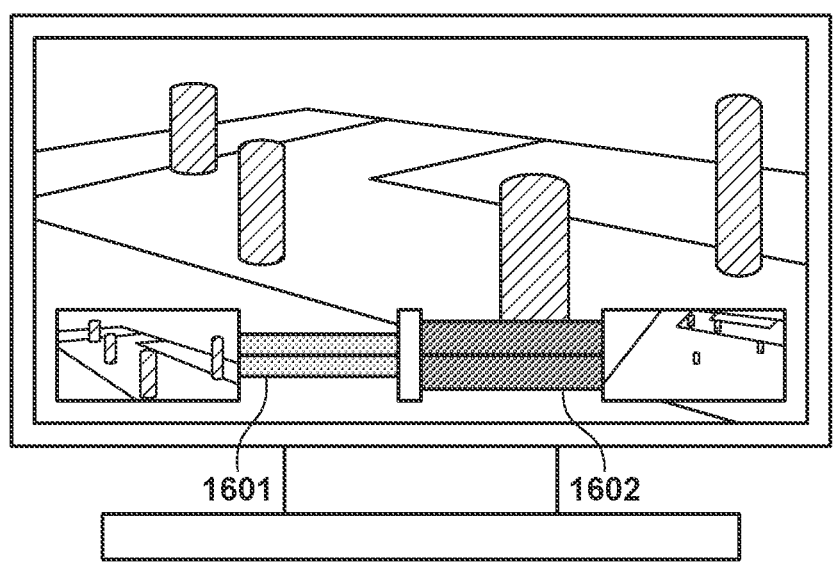
FIG. 16 is a view illustrating an example of a GUI for displaying an abnormal image quality region according to the fourth embodiment.

In step S1508, the display processing unit 211 displays the discontinuous region detected in step S1507 as an abnormal image quality region. In other words, in a case where image quality abnormality has been detected, a range in which image quality abnormality has been detected in the virtual camera path is notified as the abnormal image quality region. Here, an example of a display of an abnormal region in this step will be described with reference to FIG. 16. FIG. 16 is an example of a GUI that displays an abnormal image quality region.

Reference numerals 1601 and 1602, similarly to FIG. 8, indicate the amount of change between respective key frames but differ in the darkness of the color. The reference numeral 1601 is displayed in a dark color and the reference 1602 is displayed in a light color. It is indicated that there is a possibility that abnormality in image quality may be seen in the reference numeral 1601 in which color is displayed to be dark. Note that in the illustrated example, an example in which whether or not there is image quality abnormality in accordance with the darkness of the color displayed was described; however, the present invention is not limited to this example. For example, configuration may be taken so as to display near the reference numeral 1601 a text message indicating a possibility that there may be image quality abnormality. Any display mode may be taken so long as it is possible to depict the range in which image quality abnormality was detected and the range in which image quality abnormality was not detected in the virtual camera path in a different display mode. Then, the processing advances to step S1509. The series of processing of FIG. 15 thus ends.

As described above, in the fourth embodiment, it is detected where there is abnormality in image quality and that is displayed together with the display of an amount of change. These may be displayed at the same time or at different timings. This notifies the user that there is a possibility of image quality abnormality; accordingly, it becomes possible to prevent setting of a key frame that does not result in a desired camera path.

By virtue of the present disclosure, it becomes possible to easily generate a camera path that aligns with user intent.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-116643, filed Jul. 6, 2020, which is hereby incorporated by reference herein in its entirety.

What is claimed is:

1. An information processing apparatus comprising:
one or more memories storing instructions; and
one or more processors operable to execute the instructions to:
specify an amount of change per unit of time of a virtual camera parameter in a first period between a first key frame and a second key frame and specify an amount of change per unit of time of the virtual camera parameter in a second period between the first key frame and a third key frame, wherein the first key frame exists between the second key frame and the third key frame in chronological order, wherein the first key frame, the second key frame and the third key frame are used to generate a virtual camera path connecting the second key frame, the first key frame and the third key frame in this order, and wherein the first key frame, the second key frame, and the third key frame correspond to virtual viewpoint images at different times, and are specified based on user operations; and
notify, to a user, information based on the amount of change in the first period and the amount of change in the second period.

2. The information processing apparatus according to claim 1, wherein the virtual camera parameter includes a position of the virtual camera.

3. The information processing apparatus according to claim 1, wherein the virtual camera parameter includes an orientation of the virtual camera.

4. The information processing apparatus according to claim 1, wherein the virtual camera parameter includes a zoom ratio of the virtual camera.

5. The information processing apparatus according to claim 1, wherein the one or more processors further execute the instructions to, in a case where the amount of change is greater than or equal to a threshold, perform notification to the user.

6. The apparatus according to claim 1, wherein the one or more processors further executes the instructions to accept a key frame designation operation in accordance with a user operation, wherein the amount of change in the first period and the amount of change in the second period are specified when the first key frame is designated by the designation operation between the second key frame and the third key frame that have already been set.

7. The information processing apparatus according to claim 6, wherein the one or more processors further execute the instructions to, in a case where the amount of change is greater than or equal to a threshold, prohibit acceptance of the designation operation.

8. The information processing apparatus according to claim 7, wherein, in a case where acceptance of the designation operation is prohibited a prohibited state in which acceptance of the designation operation is prohibited is notified to the user.

9. The apparatus according to claim 1, wherein the one or more processors further executes the instructions to specify the number of frames existing in the first period and the number of frames existing in the second period, the amount of change in the first period is obtained by specifying an amount of change per frame based on the number of frames existing in the first period, and the amount of change in the second period is obtained by specifying an amount of change per frame based on the number of frames existing in the second period.

10. The information processing apparatus according to claim 1, wherein the one or more processors further execute the instructions to compare the amount of change in the first period to a threshold and the amount of change in the second period to the threshold, and the information notified to the user is generated based on a result of the comparison.

11. A method of controlling an information processing apparatus comprising:

specifying an amount of change per unit of time of a virtual camera parameter in a first period between a first key frame and a second key frame and specifying an amount of change per unit of time of the virtual camera parameter in a second period between the first key frame and a third key frame, wherein the first key frame exists between the second key frame and the third key frame in chronological order, wherein the first key frame, the second key frame and the third key frame are used to generate a virtual camera path connecting the second key frame, the first key frame and the third key frame in this order, and wherein the first key frame, the second key frame, and the third key frame correspond to virtual viewpoint images at different times, and are specified based on user operations; and notifying, to a user, information based on the amount of change in the first period and the amount of change in the second period.

12. A non-transitory computer-readable storage medium storing a computer program for causing a computer to execute a method of controlling an information processing apparatus, the method comprising:

specifying an amount of change per unit of time of a virtual camera parameter in a first period between a first key frame and a second key and specifying an amount of change per unit of time of the virtual camera parameter in a second period between the first key frame and a third key frame in chronological order, wherein the first key frame exists between the second key frame and the third key frame, wherein the first key frame, the second key frame and the third key frame are used to generate a virtual camera path connecting the second key frame, the first key frame and the third key frame in this order, and wherein the first key frame, the second key frame, and the third key frame correspond to virtual viewpoint images at different times, and are specified based on user operations; and notifying, to a user, information based on the amount of change in the first period and the amount of change in the second period.

* * * * *